(12) United States Patent
Pranis et al.

(10) Patent No.: US 7,300,801 B2
(45) Date of Patent: Nov. 27, 2007

(54) WELDED SAMPLE PREPARATION ARTICLES AND METHODS

(75) Inventors: Robert A. Pranis, St. Paul, MN (US); Craig A. Perman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 908 days.

(21) Appl. No.: 10/660,843

(22) Filed: Sep. 12, 2003

(65) Prior Publication Data

US 2005/0058576 A1   Mar. 17, 2005

(51) Int. Cl.
*G01N 1/18* (2006.01)
*B01D 24/00* (2006.01)
*B01D 35/02* (2006.01)
*B01D 53/02* (2006.01)
*G01N 1/22* (2006.01)

(52) U.S. Cl. .............. 436/178; 210/263; 210/289; 210/290; 210/490; 95/82; 95/90; 73/863.23

(58) Field of Classification Search ............ None
See application file for complete search history.

(56) References Cited

U.S. PATENT DOCUMENTS

| | | | |
|---|---|---|---|
| 3,540,856 A | 11/1970 | Rochte et al. | |
| 3,540,857 A | 11/1970 | Martin | |
| 3,540,858 A | 11/1970 | Rochte et al. | |
| 4,153,661 A | 5/1979 | Ree et al. | |
| 4,304,865 A | 12/1981 | O'Brien et al. | |
| 4,373,519 A | 2/1983 | Errede et al. | |
| 4,460,642 A | 7/1984 | Errede et al. | |
| 4,565,663 A | 1/1986 | Errede et al. | |
| 4,810,381 A | 3/1989 | Hagen et al. | |
| 4,906,378 A | 3/1990 | Hagen et al. | |
| 4,948,442 A | 8/1990 | Manns | |
| 4,948,564 A | 8/1990 | Root et al. | |
| 4,971,736 A | 11/1990 | Hagen et al. | |
| 5,071,610 A | 12/1991 | Hagen et al. | |
| 5,147,539 A | 9/1992 | Hagen et al. | |
| 5,207,915 A | 5/1993 | Hagen et al. | |
| 5,238,621 A | 8/1993 | Hagen et al. | |
| 5,264,184 A | 11/1993 | Aysta et al. | |
| 5,279,742 A | 1/1994 | Markell et al. | |
| 5,368,729 A | 11/1994 | Stefkovich et al. | |
| 5,464,541 A | 11/1995 | Aysta et al. | |
| 5,595,653 A * | 1/1997 | Good et al. ............ 210/289 |
| 5,620,663 A | 4/1997 | Aysta et al. | |
| 5,906,796 A | 5/1999 | Blevins et al. | |
| 6,492,183 B1 | 12/2002 | Perman et al. | |
| 2002/0155034 A1 | 10/2002 | Perman et al. | |
| 2003/0226796 A1 | 12/2003 | Bayer, Jr. et al. | |

FOREIGN PATENT DOCUMENTS

| | | |
|---|---|---|
| EP | 0 098 534 A1 | 1/1984 |
| EP | 0 098 534 B1 | 9/1986 |
| EP | 0 645 187 A2 | 3/1995 |
| WO | WO 03/103812 A1 | 12/2003 |

\* cited by examiner

*Primary Examiner*—Jill Warden
*Assistant Examiner*—Neil Turk
(74) *Attorney, Agent, or Firm*—Dena M. Ehrich; C. Michael Geise (57) ABSTRACT

Solid phase extraction articles, well-less filtration devices, and methods of manufacturing the articles and devices are disclosed. Methods of extracting analytes from samples using the articles and devices are also disclosed. The articles, devices and methods include a solid phase extraction medium (SPE medium) that incorporates thermoplastic material, e.g., in the form of thermoplastic particles enmeshed within a fibril matrix.

39 Claims, 3 Drawing Sheets

WELDED SAMPLE PREPARATION ARTICLES AND METHODS

BACKGROUND

Multi-well test plates, also called micro-titer plates or micro-titer test plates, are well-known and frequently used for assays involving biological or biochemical materials. Micro-titer test plates have been described in numerous patents, including, e.g., U.S. Pat. Nos. 4,948,442; 3,540,856; 3,540,857; 3,540,858; 4,304,865; 4,948,564; 5,620,663; 5,464,541; and 5,264,184; International Publication Nos. WO 97/41955 and WO 95/22406; and European Patent Nos. 645 187 and 98 534.

Selected wells in the micro-titer test plate can be used to incubate respective microcultures or to separate biological or biochemical material followed by further processing to harvest the material. Each well typically includes a filter so that, upon application of a vacuum to one side of the plate, fluid in each well is expressed through the filter leaving solids, such as bacteria and the like, entrapped in the well. The filter may also act as a membrane such that certain materials in the test specimen are selectively bonded or otherwise retained in the filter. The retained material may thereafter be harvested by means of a further solvent. The liquid expressed from the individual wells through the filter may be collected in a common collection vessel in case the liquid is not needed for further processing or alternatively, the liquid from the individual wells may be collected in individual collection containers as disclosed in U.S. Pat. No. 5,464,541 and European Patent No. 98 534.

Until recently, micro-titer plates have been used that conform to a standardized size of about 85.47 millimeters (mm) by 127.76 mm having twelve (12) rows of eight (8) wells each. Many different pieces of expensive automation equipment have been designed to this standard. However, there is now a desire to increase the productivity of such automatic sampling. To do so cost effectively, it may be desirable to design equipment based on the size of conventional micro-titer plates, but that includes an increased number of wells. This would require minimal changes in the automation equipment.

Various methods are used to produce the standard micro-titer plates having 96 wells. For example, the plates may be manufactured as multi-layer structures including a single sheet of filter material to cover the bottom apertures of all the wells, the filtration material being bonded to the periphery of one or more of the well apertures. Such a structure may, however, suffer from a problem called "cross-talk" in which fluid from adjacent wells mingles within the filter material through for example capillary action, gravity or application of pressure.

As disclosed in U.S. Pat. No. 4,304,865, a micro-titer, multi-layer plate includes a substantially rigid culture tray provided with wells having upstanding edges or rims bounding the wider openings to the wells. A mating harvester tray is used in combination with the culture tray to essentially die cut filters for each well from a single sheet of filter material. This technique of cutting the filter sheet while it overlays the wells has the disadvantage that dust formed during the cutting operation can get trapped between the walls of the well and the filter medium that may cause poor separation performance.

Another approach to the problem of cross-talk is described in U.S. Pat. No. 4,948,442 in which the wells of a culture tray and harvester tray are welded together with a filter sheet located between the two trays. This method, however, still does not completely solve the problem of cross talk. In particular, welding of the wells may not be sufficient to avoid capillary action to cause mingling of fluids from adjacent wells. Moreover, cross-talk may be even more enhanced with micro-titer plates that have a high number of wells per unit area.

U.S. Patent Application 2002/0155034 A1 describes a micro-titer plate and a well-less filtration device that addresses many of the issues discussed above. These plates and devices use a Solid Phase Extraction (SPE) medium to provide the desired separation of analytes. Although the devices are successful in addressing cross-talk between wells, the plates and well-less filtration devices can present issues in manufacturability.

SUMMARY OF THE INVENTION

The present invention, in various embodiments, provides solid phase extraction articles, well-less filtration devices, and methods of manufacturing the articles and devices. The present invention can also provide, in other embodiments, methods of extracting analytes from samples using the articles and devices. The articles, devices and methods of the present invention include a solid phase extraction medium (SPE medium) that incorporates thermoplastic material, preferably in the form of particles enmeshed within a fibril matrix.

The addition of thermoplastic material within the SPE medium in the articles and devices of the present invention can provide a number of advantages as compared to the articles described in U.S. Patent Application 2002/0155034 A1. One potential advantage is in the formation of a thicker welded seam enclosing the SPE medium between two porous support layers. The thicker seam may result in a SPE medium with a more uniform thickness profile that, in turn, may offer more uniform flow rates across the SPE medium.

Although additional thermoplastic material needed to form a thicker welded seam could potentially be provided in the form thicker support layers on one or both sides of the SPE medium, the support layers must be porous. If their thickness or density is increased to the point where the amount of thermoplastic material in the support layers is great enough to form a thicker welded seam, then the porosity of the support layers may undesirably limit flow through the article as a whole. As a result, it is often not advantageous to increase the support layer mass to improve welding characteristics.

By incorporating the thermoplastic material into the SPE medium in the form of thermoplastic particles, however, flow through the support layers may not be unduly limited and, beneficially, further advantages may be obtained. For example, the thermoplastic particles proximate the welded seams may be incorporated into the seam during the welding process resulting in a thicker seam as described above. The remaining thermoplastic particles, i.e., those that are not incorporated into the welded seam, may help control flow through the SPE medium. Flow control may be achieved by providing thermoplastic particles in selected sizes that improve flow control. Flow control may also be enhanced by, e.g., controlling the surface properties of the thermoplastic particles. Providing thermoplastic particles that are hydrophilic or hydrophobic can assist in controlling the flow of aqueous and/or organic solutions through the SPE medium.

Another potential advantage of incorporating thermoplastic particles into the SPE medium may include, e.g., dilution of the sorptive or active particles included in the SPE medium. The sorptive particles are typically provided to capture one or more analytes. In some instances, more sorptive particles may be incorporated into an SPE medium to assist in flow control or provide other properties. The addition of thermoplastic particles may, however, provide the opportunity to reduce the number of more expensive sorptive particles in the SPE medium.

In one aspect, the present invention provides a solid phase extraction article including a first porous support layer; a second porous support layer; a layer of solid phase extraction medium disposed between, and in direct contact with, the first porous support layer and the second porous support layer; and a welded seam attaching the first porous support layer and the second porous support layer, wherein a portion of the solid phase extraction medium is bound within the welded seam. The solid phase extraction medium includes a fibril matrix with sorptive particles and thermoplastic particles enmeshed in the fibril matrix.

In another aspect, the present invention provides well-less filtration device including a first support layer; a second support layer; and a solid phase extraction medium disposed between the first support layer and the second support layer, the solid phase extraction medium includes a fibril matrix that includes a fluoropolymer, sorptive particles enmeshed in the fibril matrix, and thermoplastic particles enmeshed in the fibril matrix; wherein a portion of the first support layer, a portion of the second support layer and a portion of the solid phase extraction medium are welded together to form a pattern of filter cells and land areas, wherein each of the filter cells includes a welded seam and wherein the land areas are disposed between the filter cells.

In another aspect, the present invention provides method of extracting an analyte from a sample by providing a solid phase extraction article including a first porous support layer; a second porous support layer; a layer of solid phase extraction medium disposed between, and in direct contact with, the first porous support layer and the second porous support layer; and a welded seam attaching the first porous support layer and the second porous support layer, wherein a portion of the solid phase extraction medium is bound within the welded seam; wherein the solid phase extraction medium includes a fibril matrix with sorptive particles and thermoplastic particles enmeshed in the fibril matrix. The method further includes passing a sample through the solid phase extraction article, wherein the analyte is extracted from the sample by the solid phase extraction medium.

In another aspect, the present invention provides method of manufacturing a solid phase extraction article by providing a first porous support layer; providing a second porous support layer; locating a layer of solid phase extraction medium between, and in direct contact with, the first porous support layer and the second porous support layer, wherein the solid phase extraction medium includes a fibril matrix with sorptive particles and thermoplastic particles enmeshed in the fibril matrix. The method further includes forming a welded seam to attach the first porous support layer and the second porous support layer, wherein a portion of the solid phase extraction medium is bound within the welded seam.

These and other features and advantages of the present invention may be described below in connection with various illustrative embodiments of the invention.

BRIEF DESCRIPTION OF THE DRAWINGS

The invention is further illustrated by reference to the following drawings that represent illustrative embodiments of the invention.

DETAILED DESCRIPTION OF ILLUSTRATIVE EMBODIMENTS OF THE INVENTION

In the following detailed description of illustrative embodiments, reference is made to the accompanying figures of the drawing which form a part hereof, and in which are shown, by way of illustration, specific exemplary embodiments in which the invention may be practiced. It is to be understood that other embodiments may be utilized and structural changes may be made without departing from the scope of the present invention.

Figure 1:
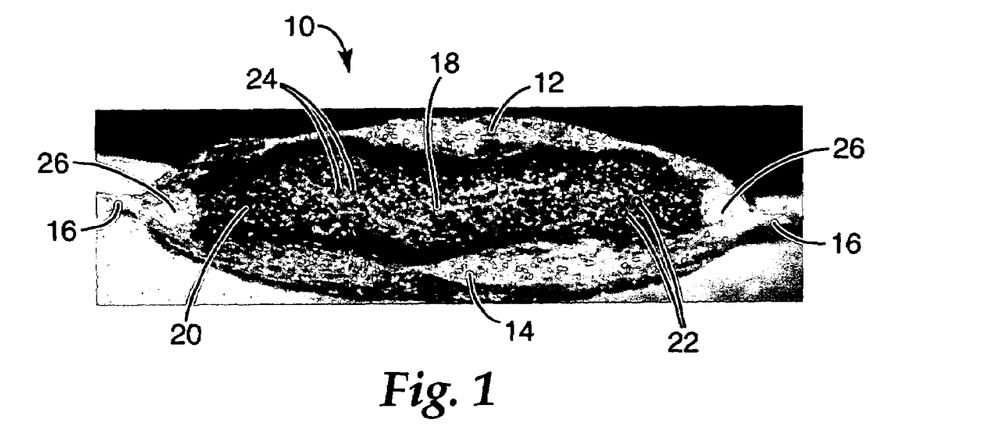
FIG. 1 is a cross-section of one illustrative example of a solid phase extraction article according to the present invention.

Referring now to FIG. 1, a solid phase extraction article 10 is depicted that includes a first porous support layer 12 and a second porous support layer 14. The first and second porous support layers 12 and 14 are preferably attached to each other by at least one welded seam 26. A layer of solid phase extraction medium 18 is located between the first and second porous support layers 12 and 14.

Both first porous support layer 12 and second porous support layer 14 are preferably in direct contact with SPE medium 18. By "direct contact" it is meant that the first and second porous support layers 12 and 14 are in physical contact with the SPE medium 18. Furthermore, by "porous" it is meant that the first and second porous support layers 12 and 14 each allow the passage of at least one liquid therethrough (it being understood that some liquids may be filtered or trapped by components in one or more of the first porous support layer 12, second porous support layer 14, and SPE medium 18).

The welded seam 26 may preferably be located at the perimeter 16 of article 10. Further, the welded seam 26 may preferably extend continuously about the entire perimeter 16 of the article 10 such that the welded seam 26, the first porous support layer 12 and the second porous support layer 14 enclose the SPE medium 18.

It may be preferred that at least one of first porous support layer 12 and second porous support layer 14 include thermoplastic material in its construction. The SPE medium 18 also preferably includes one or more thermoplastic materials in its construction. The thermoplastic materials in the SPE medium 18 and one or both of the first and second support layers 12 and 14 are present in sufficient amounts to form the welded seam 26. It may be preferred that the welded seam 26 be non-porous, i.e., not allow the passage of liquids therethrough to control diffusion through the welded seam 26.

The welded seam 26 may be formed by any suitable technique or combination of techniques. Examples of suitable techniques may include, but are not limited to, e.g., ultrasonic welding, hot press welding, spot welding, chemical welding, etc. It may be preferred that the process used include the application of pressure to compress the first and second support layers 12 and 14 and the SPE medium in the are of the welded seam during welding. It may be preferred that the welding process also include a vibrational component (such as may be present during, e.g., ultrasonic welding).

In addition to forming the welded seam 26, it may also be preferred that the welding technique be capable of cutting the support layers 12 and 14 and the SPE medium layer 18 such that a single article 10 can be formed and separated from larger webs or sheets of the three different components. In another alternative described in connection with FIGS. 5A-5C, cutting along all of the welded seams may not be required.

The SPE medium may preferably include a fibril matrix 20 and sorptive particles 22 enmeshed therein. The fibril matrix 20 may be, e.g., an open-structured entangled mass of microfibers. The sorptive particles 22 may preferably be capable of taking up an analyte of interest and holding it either by adsorption or absorption. The fibril matrix 20 may also include thermoplastic particles, such as, e.g., polypropylene particles 24.

Thermoplastic particles in the SPE medium 18 may aid in the formation of welded seam 26. In addition to improving the welding characteristics of the SPE medium, the thermoplastic particles may also provide for more uniform thickness of the SPE medium 18 and/or improved control of the flow characteristics of aqueous solutions through the article 10. The thermoplastic particles may also dilute the more expensive sorptive particles in the SPE medium 18 without significantly increasing pressure drop across the medium 18. The end result can be reduced manufactured cost and faster flow rates.

Other potential advantages of including sufficient amounts of thermoplastic in one or both of the support layers 12 and 14 and the SPE medium 18 is that the welded seam 26 may have sufficient thickness such that more even, columnar flow through the SPE medium 18 of the article 10 may be obtained. As described herein, "thickness" of any component is measured generally normal to the surfaces of the support layers 12 and 14 and the SPE medium 18.

By providing an article 10 in which the welded seam 26 has a significant thickness as compared to the thickness of the SPE medium 18 located within the article 10, the article 10 may have a more column-like form with the thickness of the SPE medium 18 being relatively uniform across the article (e.g., from seam to seam).

Thickness of the SPE medium 18 may be a determinative factor in controlling or limiting flow rate through the SPE medium 18. In other words, improving uniformity in the thickness of the SPE medium 18 across the article 10 may also improve the uniformity in flow rate through the SPE medium 18. For example, more uniform thickness of the SPE medium 18 may reduce or prevent excessive amounts of fluids passing through the edges of the article 10 where the SPE medium 18 may be thinnest.

In some embodiments, the seam thickness (i.e., the thickness of the welded seam 26) may be characterized relative to the average thickness of the SPE medium 18. With reference to FIG. 1, for example, it may be preferred that the seam thickness be 25% or more of the average thickness of the SPE medium 18 across the article 10. Alternatively, the seam thickness 26 may preferably be 50% or more of the average thickness of the SPE medium 18.

Although it may theoretically be possible to increase seam thickness by increasing the amount of material in one or both of the first and second support layers 12 and 14, such an increase would typically be expected to decrease flow rates through the support layer or layers which may not be a desired result. By incorporating thermoplastic materials in the SPE medium itself, however, the amount of thermoplastic material in the support layer or layers need not be as great. In addition, the unexpected advantages of flow rate described above by including thermoplastic particles in the SPE medium 18 would not be achieved by adding thermoplastic materials to the support layers.

In some embodiments, the SPE medium 18 may include low surface energy materials (e.g. PTFE) and higher surface energy thermoplastic layers (e.g., polypropylene). Contrary to conventional expectations that layers including low surface energy materials are not amenable to welding, the articles 10 of the present invention exhibit suitable non-porous welded seams 26 even in the presence of low surface energy materials in the SPE medium.

Regardless of the precise composition of the SPE medium or the porous support layers used in solid phase extraction articles of the present invention, when used the articles are preferably capable of extracting one or more analytes from a sample that moves through the first porous support layer (which may optionally be a prefilter as described herein) and into the SPE medium. The sample may also preferably move through the second porous support layer after passing through the SPE medium.

Porous Support Layers:

First porous support layer 12 can be made of a wide variety of porous materials. The first support layer 12 may preferably be a fibrous web that is, e.g., made of spun bonded or spun laid fibers, blown microfibers, or the like. The support layer 12 may preferably be a nonwoven web, e.g., a blown microfiber web. Preferably, the blown microfiber web includes thermoplastic materials in the form of, e.g., polyolefin fibers, more preferably polypropylene fibers—although other thermoplastic polymers can be included if desired.

The second porous support layer 14 assists in supporting and reducing abrasion to the inner solid phase extraction medium 18 while the article 10 is in use and during handling. The second support layer 14 can include a wide variety of porous materials. For example, the second support layer 14 may also preferably be a fibrous web that is, e.g., made of spun bonded or spun laid fibers, blown microfibers, or the like. The support layer 14 may preferably be a nonwoven web, e.g., a blown microfiber web. Preferably, the blown microfiber web includes thermoplastic materials in the form of, e.g., polyolefin fibers, more preferably polypropylene fibers—although other thermoplastic polymers can be included if desired.

For more effective welding, it may be preferred that the material of the first and second porous support layers 12 and 14 include compatible thermoplastic materials, i.e., thermoplastic materials that may bond together by intermixing of the same or different polymers under the bonding conditions (e.g., heat, pressure, solvents, etc. and combinations thereof). It may be preferred that the support layers 12 and 14 include at least some of the same polymeric material.

Subject to the limitation that at least one of the first and second support layers 12 and 14 include at least some thermoplastic material, the fibers forming nonwoven webs of either or both of the first and second support layers 12 and 14 may be formed of natural or synthetic fibers such as polypropylene, polyethylene, polyester, nylon, cellulose, or polyamides, or combinations of such materials, such as a multicomponent fiber (e.g., a core/sheath fiber such as a core of polyester and a sheath of polypropylene which provides relatively high strength due to its core material and is easily bonded to polypropylene strands due to its sheath material). Fibers of different materials or material combinations may also be used in the nonwoven webs.

Optionally, one of the first and second support layers may be a scrim, i.e. a thin porous support layer. As a scrim, such a support layer would provide support for the SPE medium 18 and help protect the SPE medium 18 from potentially damaging abrasion during shipping and handling. Typically, however, a scrim layer would not be expected to contribute significant amounts of thermoplastic material to form the welded seam 26.

The articles 10 of the present invention may take any desired shape (when viewed along an axis normal to the surfaces of the support layers 12 and 14). For example, the articles 10 may be circular, square, rectangular, hexagonal, octagonal, oval, etc. Regardless of the shape of the article 10, it may be preferred that the welded seam 26 be located proximate the perimeter of the article 10, more preferably that the welded seam 26 extend continuously around the entire perimeter of the article 10. It may be preferred that at least a portion of the SPE medium 18 be pinched or wedged between the two porous support layers 12 and 14 to reduce distortion or shifting of the SPE medium 18 during handling and use.

The porous support layers may be constructed of any suitable material or materials that do not unduly restrict the flow of aqueous or other sample liquids through the web or in any significant way reduce the function of the SPE medium. The material or materials for the porous support layers should be chosen such that they are capable of being welded to form welded seam 26. Suitable thermoplastic polymeric materials may include, but are not limited to, polycarbonates, polyesters, polyamides, and polyolefins such as polyethylene, polypropylene, ethylene/propylene copolymers, and blends thereof. Copolymers as used herein include random, block, grafted, etc. polymers prepared from two or more different types of monomers.

It may be preferred that at least one of the porous support layers 12 and 14 be a nonwoven web made of polypropylene with a basis weight of at least 14 grams per square meter ($g/m^2$) or more, more preferably 17 $g/m^2$ or more. At the upper end of the range, it may be preferred that the porous support layer have a basis weight of 70 $g/m^2$ or less, more preferably 35 $g/m^2$ or less. The thickness of such a web may preferably be less than 1 mm. It may be preferred that both of the support layers 12 and 14 have the characteristics described in this paragraph.

Porous support layers that are in the form of nonwoven webs may be embossed if desired for enhanced strength. For example, heat embossing at points approximately 0.006 $cm^2$ area spaced approximately 1.25 mm on center can be instituted. The porous support layers should, however, retain sufficient porosity to allow desired flow rates. Materials suitable for the support layers that are commercially available include a nonwoven web available from BBA Nonwovens of Simpsonville, S.C. under the product name CELESTRA.

Also, although the support layers 12 and 14 are depicted as monolayer structures, it should be understood that one or both of the support layers may be provided as multilayer structures that include two or more separate layers laminated or otherwise attached to each other.

Prefilter Support Layer:

One of the support layers 12 and 14 may be provided with functionality to act as a prefilter to materials passing through the article 10. For example, a prefilter support layer may filter or retain at least a portion one or more materials before they reach the SPE medium 18. Such prefilters may be particularly useful if the SPE article is used in a well-less filtration device as described herein.

A wide variety of fibrous materials can be used to make a prefilter support layer for use in connection with the present invention. The choice of materials used in making the prefilter can be matched, for example, by polarity, to the analyte being extracted if it is desired to enhance extraction. Alternatively, the prefilter layer can be matched to contaminants that can detrimentally affect the quantitative or qualitative evaluation of the analyte of interest.

A prefilter support layer can be a nonwoven web made of, e.g., spun bonded fibers, carded fibers, spun laid or spun laced fibers, blown microfibers, or the like. A blown microfiber (BMF) web may be preferred. For making a BMF web, a resin having a melt flow index of about 43 to about 400 is particularly preferred. Commercially available examples of resins can be obtained from Fina Petroleum of Houston, Tex. One suitable polypropylene resin is available under the trade designation FINA 3860.

The fibers of a fibrous prefilter support layer may preferably have a diameter of at least about 0.1 microns, more preferably 1.0 microns, and most preferably 7 microns. Preferably, the fiber diameter is no greater than about 20 microns, more preferably 15 microns, and most preferably 12 microns. Also, a prefilter support layer may preferably have a solidity of no greater than 20%, more preferably, no greater than 15%, and most preferably, no greater than 10%. At he lower end, the solidity may be at least 5%. A prefilter support layer may have a thickness of at least 0.5 mm, more preferably, at least 1 mm. and most preferably, at least 2 mm. Preferably, the thickness is no greater than 0.5 mm. Preferably, the prefilter support layer may have a basis weight of at least 70 $g/m^2$, more preferably, at least 100 $g/m^2$, and most preferably, at least 200 $g/m^2$. Preferably, the basis weight is no greater than 300 $g/m^2$.

Solid Phase Extraction Medium:

The solid phase extraction medium used in connection with the present invention can include a wide variety of materials in various forms. For example, the SPE medium can be in the form of particles, which may be loose or immobilized, fibers, a membrane, or other porous material that have a high surface area. In one exemplary embodiment, the SPE medium is in the form of a fibril matrix with sorptive particles enmeshed therein. Such sorptive particles may preferably be the "active" element of the SPE medium in that they may function to capture the analyte or analytes of interest.

The fibril matrix used in such a SPE medium can include any of a wide variety of fibers. Suitable fibers may include, but are not limited to glass fibers, polyolefin fibers (e.g., polypropylene microfibers, polyethylene microfibers, etc.), aramid fibers, fluoropolymer (e.g., polytetrafluoroethylene) fibers, cellulosic fibers, etc. The fibril matrix may be made of one type of fiber or mixtures of two or more different fibers may be used. The fibers in the fibril matrix may be active, i.e., designed to capture an analyte or analyte of interest or they may chosen for their ability to filter unwanted materials from the mixture or solution passing through the SPE medium. The fibril matrix may, for example, form a layer that is 15 mm to 40 mm thick.

The sorptive (active) particles of the SPE medium are typically chosen for their affinity for the target analyte or analytes. The particles may preferably be insoluble in an aqueous or organic liquid used to carry the analyte or analytes of interest. Although described as particles, it should be understood that the sorptive particles may take any suitable physical form, e.g., fibers, spheroidal particles, cubes, crystalline shapes, etc.

The sorptive particles can be made of one material or a combination of materials as in a coated base particle. The base particles can include inorganic oxides such as silica, alumina, titania, zirconia, etc., to which are covalently bonded organic groups. For analysis of nonpolar hydrocarbon (e.g., hexane) extractable compounds, for example, covalently bonded organic groups such as aliphatic groups of varying chain length (C2, C4, C8, or C18 groups) can be used. Preferred C18 bonded silica particles are available from United Chemical Technologies, Inc., Bristol, Pa.

In some instances, only one type of sorptive particle may be provided in the SPE medium 18. Alternatively, two or more different sorptive particles may be included within the SPE medium. The different particles may be selected for their affinity for the same analyte or different analytes.

The sorptive particles can be swellable, nonswellable, or combinations of both, although they may preferably be nonswellable in water and organic liquids. Water swellable particles are described in, e.g., U.S. Pat. No. 4,565,663 (Errede et al.); U.S. Pat. No. 4,460,642 (Errede et al.); and U.S. Pat. No. 4,373,519 (Errede et al.). Particles that are nonswellable in water are described in, e.g., U.S. Pat. No. 4,810,381 (Hagen et al.); U.S. Pat. No. 4,906,378 Hagen et al; U.S. Pat. No. 4,971,736 (Hagen et al.); and U.S. Pat. No. 5,279,742 (Markell et al.).

Examples of suitable SPE mediums that may form the starting point for SPE mediums of the present invention may be described in, e.g., U.S. Pat. No. 6,492,183 B1 (Perman et al.) and U.S. Patent Publication No. US 2002/0155034 A1 (Perman et al.). The SPE mediums used in connection with the present invention preferably include, however, at least some thermoplastic particles in addition to or in place of one or more of the components described in the documents cited directly above.

The thermoplastic particles may take any suitable form such as, e.g., fibers, spheroidal particles, cubes, crystalline shapes, etc. The thermoplastic particles may be formed from, e.g., polyolefins, polycarbonates, polyester or polyamide particles. If provided as spheroidal particles, it may be preferred that the thermoplastic particles have a diameter of 5 microns or more. At the upper end, it may be preferred that the particles have a diameter of 80 microns or less.

It may be preferred that the SPE medium in articles of the present invention include both sorptive particles and thermoplastic particles enmeshed in a separate fibril matrix (that may or may not itself include thermoplastic material). In such an embodiment, the thermoplastic particles may preferably be present in the SPE medium in an amount of 10 wt-% or more of the combined weight of both the sorptive particles and thermoplastic particles in the SPE medium. At the upper end of the range, the thermoplastic particles may preferably be present in the SPE medium in an amount of 95 wt-% or less of the combined weight of both the sorptive particles and thermoplastic particles in the SPE medium.

Examples of some suitable SPE media may be described in, e.g., U.S. Pat. No. 5,279,742 (Markell et al.), U.S. Pat. No. 4,906,378 (Hagen et al.), U.S. Pat. No. 4,153,661 (Ree et al.), U.S. Pat. No. 5,071,610 (Hagen et al.), U.S. Pat. No. 5,147,539 (Hagen et al.), U.S. Pat. No. 5,207,915 (Hagen et al.), and U.S. Pat. No. 5,238,621 (Hagen et al.).

In one example, the SPE medium may include C18 bonded silica beads (approximately 5-6 wt-%, based on the total weight of the beads), which sorb hydrocarbon compounds from water, and glass beads having a mean volume particle size of about 70 microns (approximately 94-95 wt-%, based on the total weight of the beads), which aid in rapid flow-rates, enmeshed within a polytetrafluoroethylene (PTFE) fibrous membrane. The PTFE membrane makes up approximately 1-2 wt-% of the SPE medium, based on the total weight of the SPE medium. The PTFE matrix may, for example, be prepared according to the procedure described in U.S. Pat. No. 4,906,378 (Hagen et al.).

Although depicted as a single layer, the SPE medium may optionally include multiple layers of the same or different suitable materials. In such cases, it may be preferred that a porous support layer be located between different layers in the SPE medium.

Other SPE products that can be used in the present invention. Such products are available from Whatman, Inc. of Clifton, N.J., CPI International of Santa Rosa, Calif., and J. T. Baker, Phillipsburg, N.J. These products typically include silica particles with coatings of covalently bonded aliphatic hydrocarbons. For some of the products, the particles are enmeshed within glass fibers. The latter products may be protected by an outer scrim, which may or may not be used in the constructions of the present invention.

Methods of Making SPE Articles:

The SPE articles of the present invention can be made using a variety of techniques. In one aspect, the outer edges of the two outermost layers, i.e., first and second porous support layers 12 and 14 (see FIG. 1) are welded together at their edges.

The first and second support layers 12 and 14 are preferably welded together with the SPE medium 18 located therebetween. As discussed above, the welding may be performed by a variety of techniques such as, e.g., ultrasonic welding, hot press welding, spot welding, chemical welding, etc. It may be preferred that the process used include the application of pressure to compress the first and second support layers 12 and 14 and the SPE medium in the are of the welded seam during welding. It may be preferred that the welding process also include a vibrational component (such as may be present during, e.g., ultrasonic welding). In some instances, a portion of the SPE medium may be bound within the welded seam. In such a case, the SPE medium can be physically encased or wedged in the welded seam. The welding process may also result in cutting the layers into a desired shape and dimension for the desired SPE article.

Welding the first and second support layers 12 and 14 together with the SPE medium located therebetween may be particularly difficult when the inner SPE medium 18 includes PTFE (in, e.g., a fibril matrix enmeshing sorptive particulates). Due to the low surface energy of PTFE, it typically resists molten resin flow and therefore has minimal capability for being bonded. This resistance thus typically prevents the formation of any permanent weld seam. However, by taking advantage of the different material characteristics between the multiple layers, it has been surprisingly found that, for example, the use of vibrational energy during welding (e.g., ultrasonic energy) can result in acceptable welding performance. Furthermore, the weld seam may be highly localized, making it possible to encase the PTFE membrane between the two outermost support layers without significantly damaging or crushing the internal web over the usable internal diameter. The result is a one-piece multilayer extraction disk capable of providing good extraction and flow rate performance.

Figure 2:
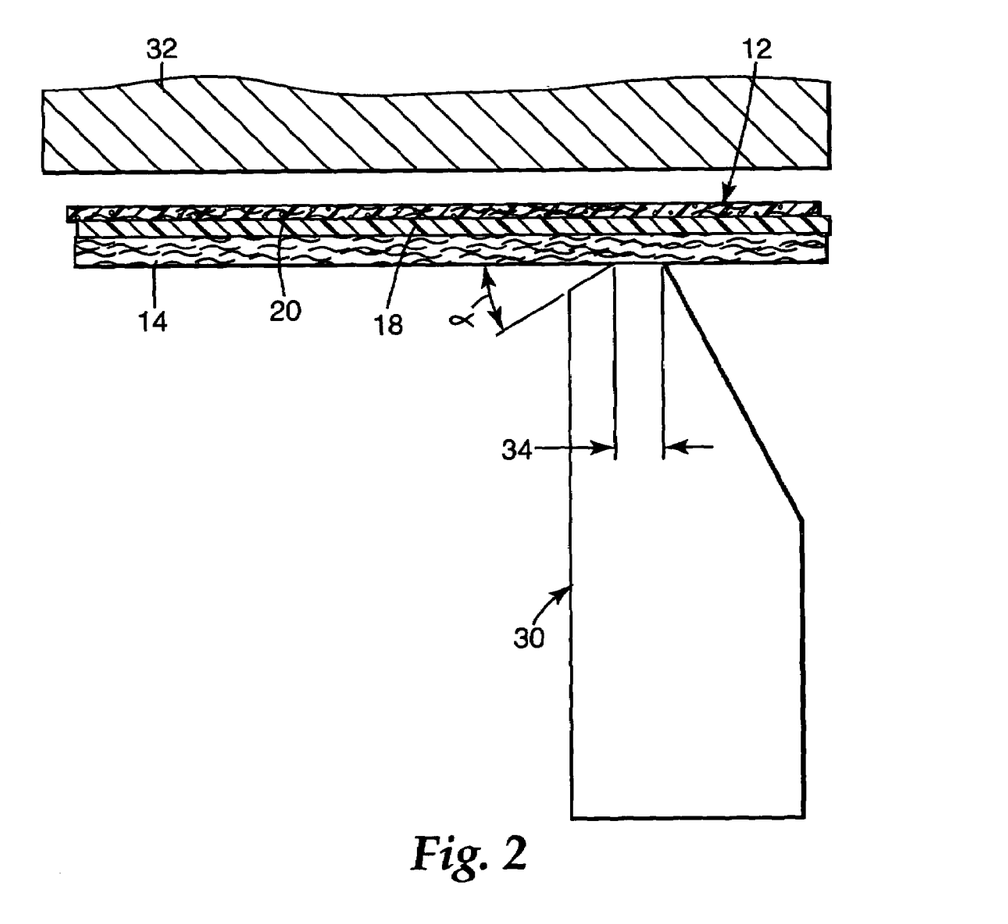
FIG. 2 is a cross-sectional view of one illustrative example of a welding apparatus that can be used to manufacture solid phase extraction articles and devices of the present invention (before welding).

FIG. 2 depicts one ultrasonic welding process in which an SPE medium 18 is located between first and second support layers 12 and 14. The different components may be provided in sheet form or as a web having a width and an indefinite length.

The SPE medium layer 18 preferably includes a fibril matrix 20 in which sorptive particles and thermoplastic particles are enmeshed. The fibril matrix 20 may preferably include or be made of a low surface energy material such as PTFE. Optionally, the PTFE matrix 20 may also include inactive (i.e., nonsorptive) particles such as glass beads that do not contribute to the welding process but that may provide other functions.

The different layers are positioned, in the depicted process, over a cut-and-seal ultrasonic welding anvil 30 of an ultrasonic welder (e.g., Branson 900 Series Ultrasonic Welder available from Branson Ultrasonics, Inc. of Danbury Conn.). The welding anvil 30 converts the layers into a one-piece multilayer format, by a combination and substantially simultaneous plunging and welding operation. This process provides a welded seam between the two porous support layers 12 and 14.

During the plunge welding operation, a flat, hardened steel ultrasonic horn 32 traverses, firmly pressing the three layers 12, 14, and 18 against a welding surface 34 located on anvil 30. Anvil 30 may preferably have a cutting angle α of no less than 20°, preferably 25°. Cutting angle α may preferably not be greater than 40°, preferably, not greater than 35°. Welding surface 34 may preferably measure no less than 0.01 centimeter (cm) wide, preferably, no less than 0.02 cm wide. Additionally, welding surface 34 may preferably be no greater than 0.04 cm wide, preferably, no greater than 0.03 cm wide.

Figure 3:
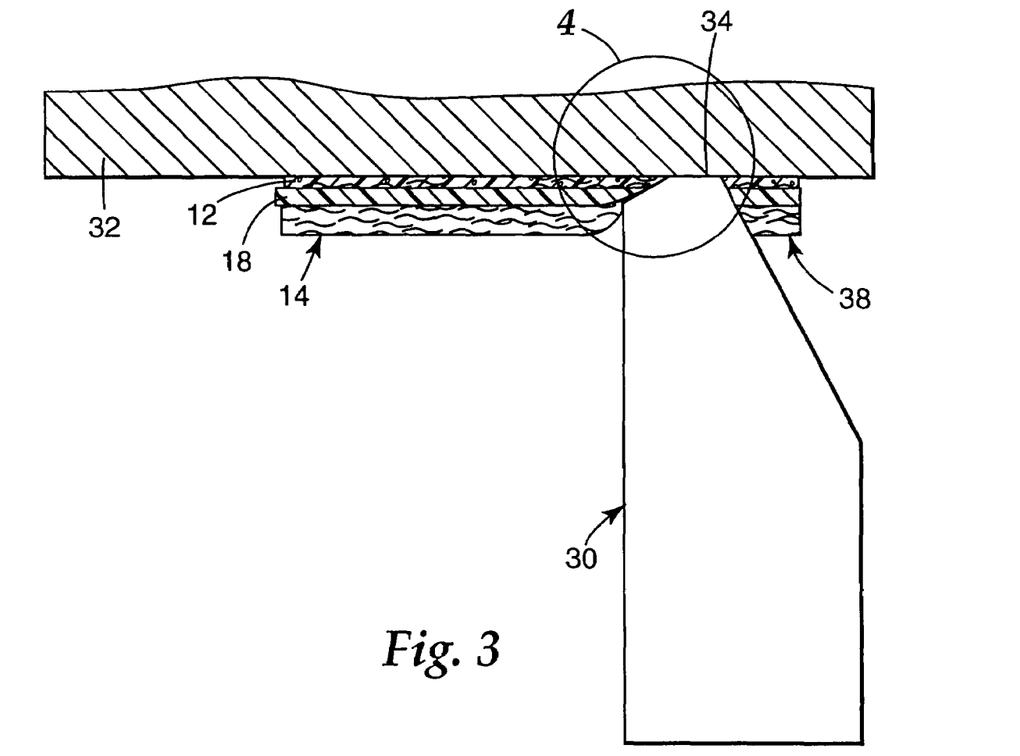
FIG. 3 is a view of the welding apparatus of FIG. 2 during welding.

FIG. 3 depicts the compression of layers 12, 14 and 18 during the pinching and welding operation. During the pinching operation, ultrasonic energy is applied under pressure. The air pressure of the welder may be set at, e.g., 50 pounds per square inch (psi) (350 kPa) to 100 psi (700 kPa), e.g., 70 psi (475 kPa). The weld time may be set at a low setting of, e.g., 0.5 second, preferably, 0.9 second. A high setting for the weld time may be 1.5 seconds, alternatively 1.0 second.

Figure 4:
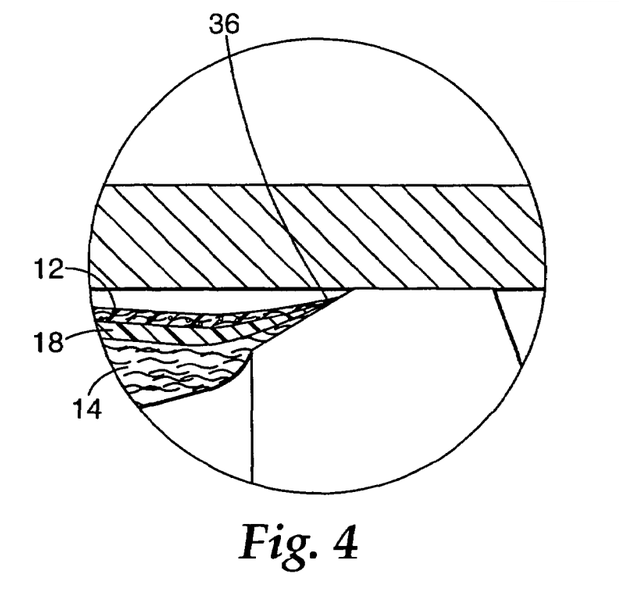
FIG. 4 is an exploded view of section A of FIG. 3.

The ultrasonic energy from the welder melts and bonds the two outer nonwoven webs 12 and 14 together such that the molten material forms a localized weld seam 36 about the perimeter of the article as depicted in FIG. 4. A hold time may be set at 0 second on the low end, alternatively 0.15 second. On the upper end of the hold time range, the hold time parameter for the welder may be 0.25 second, alternatively 0.17 second.

If cutting is desired (as depicted in FIGS. 3 and 4) the molten material along the outside circumference of the SPE article may be compressed such that excess material 38 flows away from the flat 34 of the anvil 30, thereby, resulting in a separation of the sealed article from the surrounding material.

Well-Less Filtration Device:

As an alternative to combining the welding and cutting operations, the present invention may also involve the formation of a well-less filtration device, i.e., an article that includes multiple interconnected filter cells connected by land areas as described in, e.g., U.S. Patent Application Publication No. US 2002/0155034 A1 (Perman et al.).

Figure 5A:
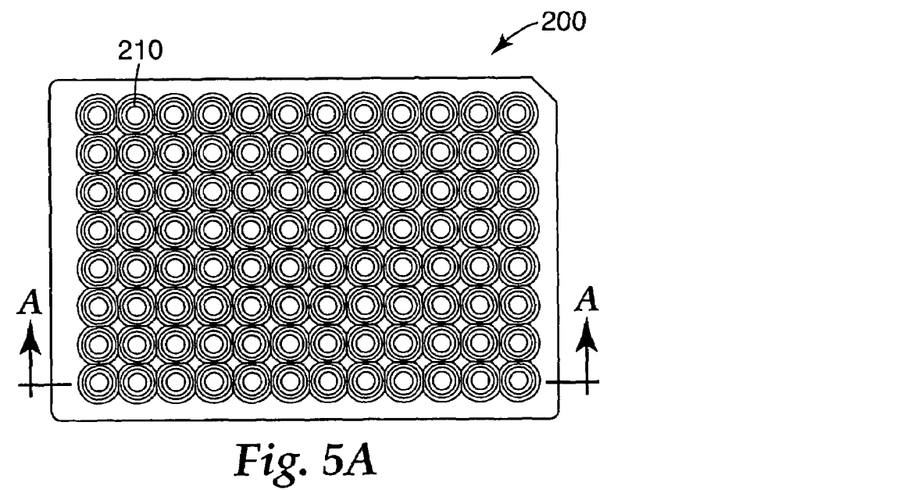
FIG. 5A is a schematic top view of one illustrative example of a well-less filtration device according to the present invention.
Figures 5B, 5D:
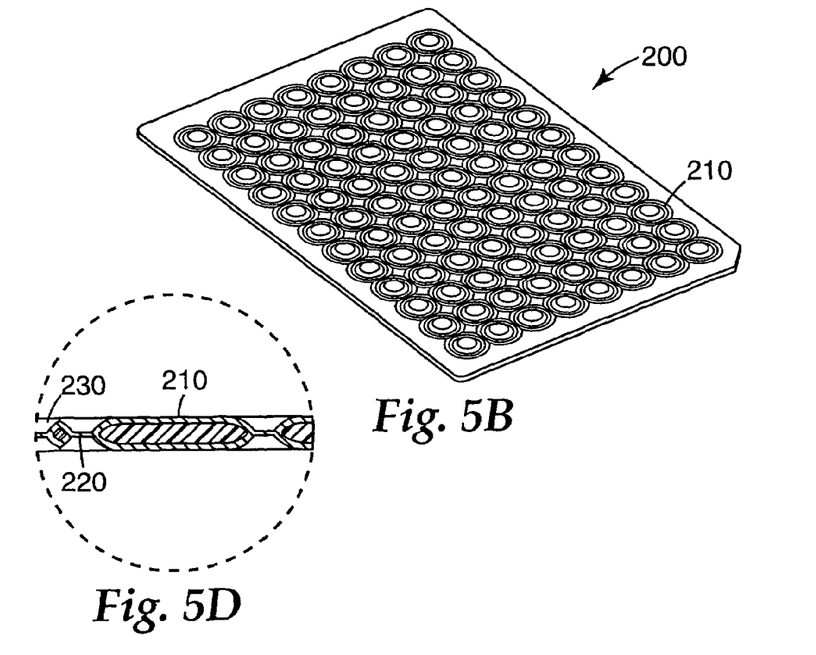
FIG. 5B is a schematic perspective view the well-less filtration device of FIG. 5A.
FIG. 5D is a schematic representation of an expanded area of FIG. 5C.
Figure 5C:
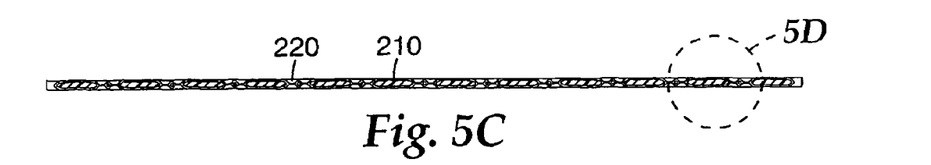
FIG. 5C is a schematic representation of cross-section AA of FIG. 5A.

Such devices may preferably include a prefilter layer (more preferably a nonwoven prefilter) on one side of the SPE medium and a support layer on the opposite side of the SPE medium. FIGS. 5A-5D illustrate an embodiment of one well-less filtration device according to the present invention. FIG. 5A is a schematic top view and FIG. 5B is a schematic perspective view of the well-less filtration device 200. FIG. 5C is a schematic representation of cross-section AA of FIG. 5A showing multiple individual filter cells 210 and the interconnecting compressed land areas 220. Each of the filter cells 210 includes a welded seam proximate its periphery as described above with respect to the individual SPE articles. The welded seam may preferably extend continuously about the periphery of the filter cell.

FIG. 5D is a schematic representation of an expanded area of FIG. 5C that more clearly shows one filter cell 210 including compressed land areas 220. FIG. 5D also shows smaller uncompressed areas 230 that may optionally be included between adjacent filter cells 210.

Various modifications and alterations of this invention will become apparent to those skilled in the art without departing from the scope of this invention, and it should be understood that this invention is not to be unduly limited to the illustrative embodiments set forth herein. The complete disclosures of all patents, patent documents, and publications cited herein are incorporated by reference as if each were individually incorporated by reference.

The invention claimed is:

1. A solid phase extraction article comprising:
a first porous support layer;
a second porous support layer;
a layer of solid phase extraction medium disposed between, and in direct contact with, the first porous support layer and the second porous support layer; and
a welded seam attaching the first porous support layer and the second porous support layer, wherein a portion of the solid phase extraction medium is bound within the welded seam;
wherein the solid phase extraction medium comprises a fibril matrix comprising sorptive particles and thermoplastic particles enmeshed in the fibril matrix.

2. The article of claim 1, wherein the welded seam extends about a periphery of the solid phase extraction article.

3. The article of claim 1, wherein the welded seam extends continuously about a periphery of the solid phase extraction article.

4. The article of claim 1, wherein the welded seam extends continuously about a periphery of the solid phase extraction article such that the solid phase extraction medium is located within a volume defined by the first porous support layer, the second porous support layer, and the welded seam.

5. The article of claim 1, wherein the solid phase extraction medium comprises an average thickness measured in a direction normal to the first porous layer and the second porous layer, and wherein the welded seam comprises a seam thickness measured in the direction normal to the first porous support layer and the second porous support layer, wherein the seam thickness is 25% or more of the average thickness of the solid phase extraction medium.

6. The article of claim 5, wherein the seam thickness is 50% or more of the average thickness of the solid phase extraction medium.

7. The article of claim 1, wherein the sorptive particles are selected from the group consisting of silica particles, resin polymers, chelating particles, ion exchange particles, and combinations of two or more thereof.

8. The article of claim 1, wherein the thermoplastic particles comprise a polymer selected from the group consisting of polyolefin, polycarbonate, polyester, polyamide and combinations of two or more thereof.

9. The article of claim 1, wherein the thermoplastic particles comprise 10 wt-% or more of the combined weight of both the sorptive particles and thermoplastic particles in the solid phase extraction medium, and wherein the thermoplastic particles comprise 95 wt-% or less of the combined weight of both the sorptive particles and thermoplastic particles in the solid phase extraction medium.

10. The article of claim 1, wherein the thermoplastic particles comprise spheroidal particles comprising a diameter of 5 microns or more, and wherein the spheroidal particles comprise a diameter of 80 microns or less.

11. The article of claim 1, wherein the fibril matrix comprises a fluoropolymer.

12. The article of claim 1, wherein at least one of the first porous support layer and the second porous support layer comprises thermoplastic material.

13. The article of claim 1, wherein the first porous support layer comprises a nonwoven pre-filter that comprises a solidity of no greater than 20%, a thickness of at least 0.5 mm, and a basis weight of at least 70 g/m$^2$.

14. The article of claim 1 wherein the first porous support layer comprises a non-woven web that comprises thermoplastic fibers.

15. The article of claim 1, wherein the first porous support layer and the second porous support layer each comprise a thermoplastic material, and wherein the thermoplastic material in the first porous support layer and the second porous support layer is the same.

16. A method of extracting an analyte from a sample, the method comprising:
providing a solid phase extraction article comprising:
a first porous support layer;
a second porous support layer;
a layer of solid phase extraction medium disposed between, and in direct contact with, the first porous support layer and the second porous support layer; and
a welded seam attaching the first porous support layer and the second porous support layer, wherein a portion of the solid phase extraction medium is bound within the welded seam;
wherein the solid phase extraction medium comprises a fibril matrix comprising sorptive particles and thermoplastic particles enmeshed in the fibril matrix; and
passing a sample through the solid phase extraction article, wherein the analyte is extracted from the sample by the solid phase extraction medium.

17. The method of claim 16, wherein the welded seam extends about a periphery of the solid phase extraction article.

18. The method of claim 16, wherein the welded seam extends continuously about a periphery of the solid phase extraction article such that the solid phase extraction medium is located within a volume defined by the first porous support layer, the second porous support layer, and the welded seam.

19. The method of claim 16, wherein the solid phase extraction medium comprises an average thickness measured in a direction normal to the first porous layer and the second porous layer, and wherein the welded seam comprises a seam thickness measured in the direction normal to the first porous support layer and the second porous support layer, wherein the seam thickness is 25% or more of the average thickness of the solid phase extraction medium.

20. The method of claim 19, wherein the seam thickness is 50% or more of the average thickness of the solid phase extraction medium.

21. The method of claim 16, wherein the sorptive particles are selected from the group consisting of silica particles, resin polymers, chelating particles, ion exchange particles, and combinations of two or more thereof.

22. The method of claim 16, wherein the thermoplastic particles comprise a polymer selected from the group consisting of polyolefin, polycarbonate, polyester, polyamide and combinations of two or more thereof.

23. The method of claim 16, wherein the thermoplastic particles comprise 10 wt-% or more of the combined weight of both the sorptive particles and thermoplastic particles in the solid phase extraction medium, and wherein the thermoplastic particles comprise 95 wt-% or less of the combined weight of both the sorptive particles and thermoplastic particles in the solid phase extraction medium.

24. The method of claim 16, wherein the thermoplastic particles comprise spheroidal particles comprising a diameter of 5 microns or more, and wherein the spheroidal particles comprise a diameter of 80 microns or less.

25. The method of claim 16, wherein the fibril matrix comprises a fluoropolymer.

26. The method of claim 16, wherein at least one of the first porous support layer and the second porous support layer comprises thermoplastic material.

27. A method of manufacturing a solid phase extraction article, the method comprising:
providing a first porous support layer;
providing a second porous support layer;
locating a layer of solid phase extraction medium between, and in direct contact with, the first porous support layer and the second porous support layer, wherein the solid phase extraction medium comprises a fibril matrix comprising sorptive particles and thermoplastic particles enmeshed in the fibril matrix; and
forming a welded seam to attach the first porous support layer and the second porous support layer, wherein a portion of the solid phase extraction medium is bound within the welded seam.

28. The method of claim 27, wherein the welded seam extends about a periphery of the solid phase extraction article.

29. The method of claim 27, wherein the welded seam extends continuously about a periphery of the solid phase extraction article.

30. The method of claim 27, wherein the welded seam extends continuously about a periphery of the solid phase extraction article such that the solid phase extraction medium is located within a volume defined by the first porous support layer, the second porous support layer, and the welded seam.

31. The method of claim 27, wherein the solid phase extraction medium comprises an average thickness measured in a direction normal to the first porous layer and the second porous layer,
and wherein the welded seam comprises a seam thickness measured in the direction normal to the first porous support layer and the second porous support layer, wherein the seam thickness is 25% or more of the average thickness of the solid phase extraction medium.

32. The method of claim 31, wherein the seam thickness is 50% or more of the average thickness of the solid phase extraction medium.

33. The method of claim 27, wherein the sorptive particles are selected from the group consisting of silica particles, resin polymers, chelating particles, ion exchange particles, and combinations of two or more thereof.

34. The method of claim 27, wherein the thermoplastic particles comprise a polymer selected from the group consisting of polyolefin, polycarbonate, polyester, polyamide and combinations of two or more thereof.

35. The method of claim 27, wherein the thermoplastic particles comprise 10 wt-% or more of the combined weight of both the sorptive particles and thermoplastic particles in the solid phase extraction medium, and wherein the thermoplastic particles comprise 95 wt-% or less of the combined weight of both the sorptive particles and thermoplastic particles in the solid phase extraction medium.

36. The method of claim 27, wherein the thermoplastic particles comprise spheroidal particles comprising a diameter of 5 microns or more, and wherein the spheroidal particles comprise a diameter of 80 microns or less.

37. The method of claim 27, wherein the fibril matrix comprises a fluoropolymer.

38. The method of claim 27, wherein at least one of the first porous support layer and the second porous support layer comprises thermoplastic material.

39. The method of claim 27, wherein the first porous support layer and the second porous support layer each comprise a thermoplastic material, and wherein the thermoplastic material in the first porous support layer and the second porous support layer is the same.

* * * * *